July 12, 1966     B. T. WALL     3,260,371
DISPOSAL SYSTEM FOR DECOMPOSABLE ORGANIC WASTES
Filed Sept. 6, 1963
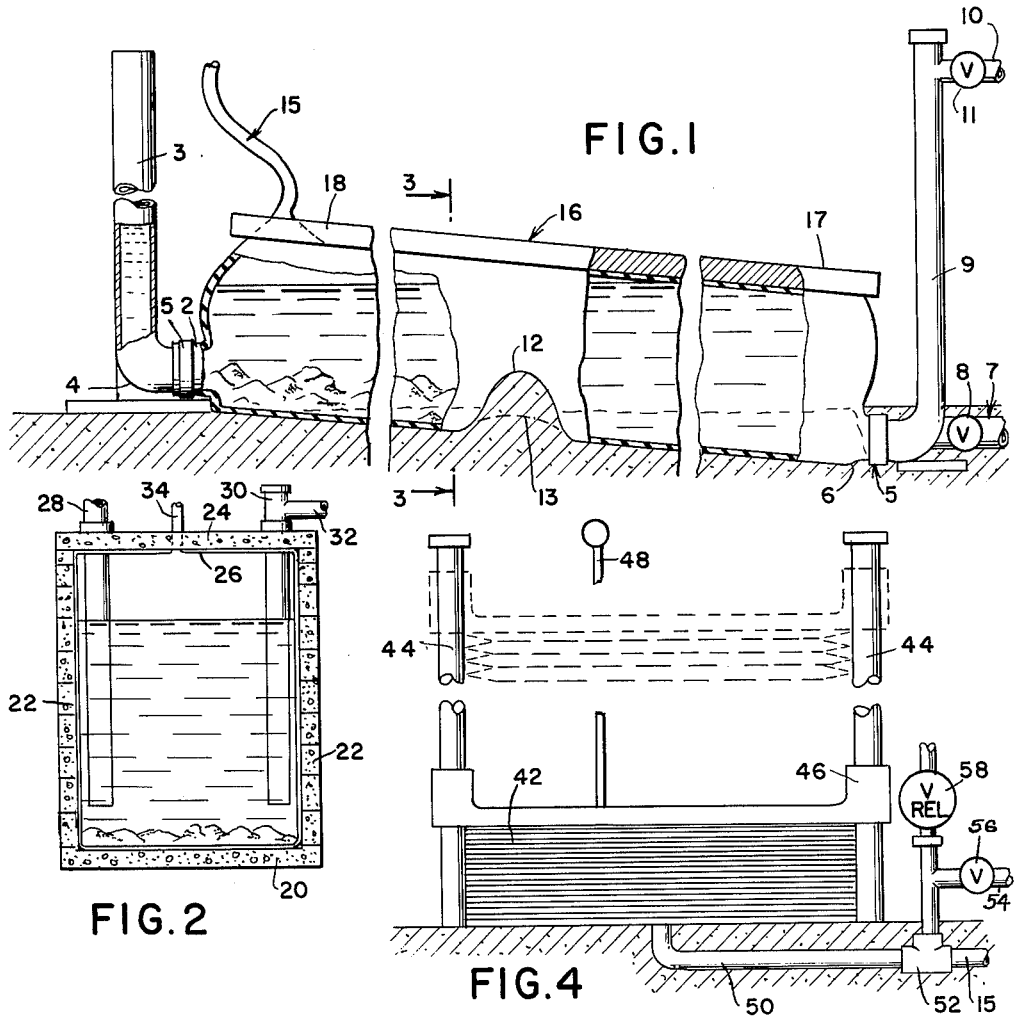
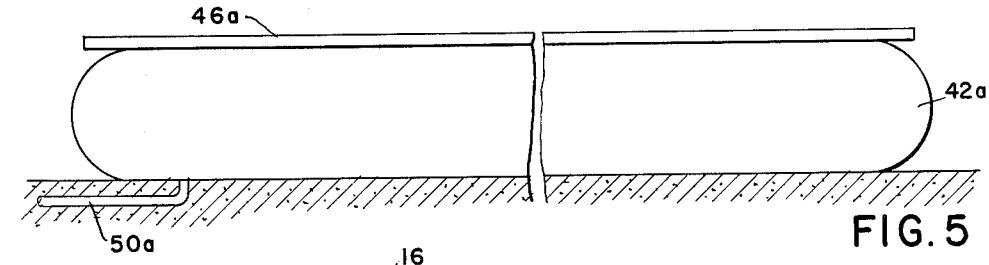
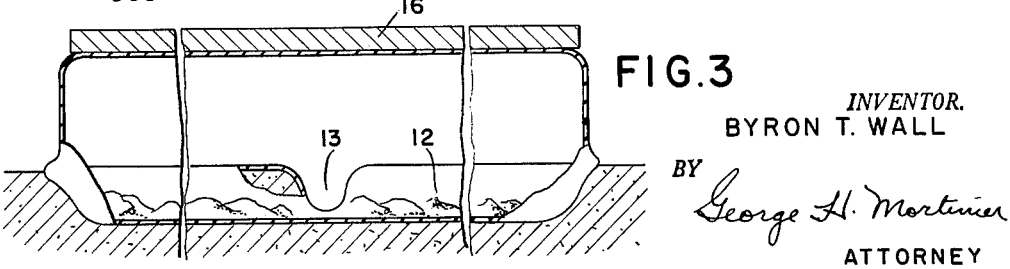
INVENTOR.
BYRON T. WALL
BY George H. Mortimer
ATTORNEY

United States Patent Office 3,260,371
Patented July 12, 1966

3,260,371
DISPOSAL SYSTEM FOR DECOMPOSABLE ORGANIC WASTES
Byron T. Wall, 143—20 Franklin Ave., Flushing, N.Y.
Filed Sept 6, 1963, Ser. No. 307,241
8 Claims. (Cl. 210—533)

The present invention relates to a disposal system for organic wastes that decompose, e.g., human sewage, that is inexpensive, simple and easy to install and maintain and which operates with little care and attention.

The problem of disposing of organic wastes, especially human fecal matter, is a serious problem in many places, e.g., pleasure boats, temporary camp sites and other areas where sewage systems are not installed.

The present invention satisfies a long felt need for a solution to this problem. It will be described in detail in conjuction with the drawing in which:

FIG. 1 is a side elevational view of a disposal system embodying the invention;

FIG. 2 shows the invention applied within a chamber, which might be an existing septic tank or cesspool, the bilge compartment of a boat, or the like;

FIG. 3 is a sectional view along the line 3—3 of FIG. 1 looking in the direction of the arrows;

FIG. 4 is a side elevation of a suitable gas storage tank; and

FIG. 5 is a side elevation of another suitable form of gas storage tank.

The sewage disposal system of the invention operates in accordance with known bacterial decomposition of organic wastes such as human feces, plant matter and the like. When such organic waste is wet with water bacterial action will develop naturally but the action can frequently be accelerated by seeding, addition of active sludge from established functioning units, and the like as those skilled in this art know. To effect such decomposition requires time and the present invention provides a system having sufficient capacity to hold the wastes to be decomposed until that action has gone substantially to completion. With fecal matter the decomposition converts about 80% to volatile gases and leaves about 20% non-volatile matter or sludge. The volatile gases can be put to use, e.g., in an internal combustion engine to produce power, and the sludge can be used safely for fertilizer. The effluent liquid flowing from a properly operating system can be discharged into natural drainage channels without danger of polluting nearby wells, springs and other sources of potable water.

The system of the present invention may also be used to treat industrial wastes which may be admixed with organic wastes for treatment or treated separately. For example acid or alkaline wastes may be neutralized before discharge into natural drainage channels and by using a system of sufficient capacity peak loads can be taken into it and discharged at a desired rate into natural discharge channels.

Referring now to FIG. 1 a flexible container 1 is provided with an inlet 2, e.g., a neck, which is secured to an upwardly extending pipe 3 having a bend or elbow 4 at its lower end over which the neck 2 is held in fluid-tight relation by a band or clamp 5. Container 1 is also provided with an outlet 6, e.g., a neck, connected by a band or clamp 5 to a horizontal section 7 of pipe having a valve 8 to control flow therefrom. Connected to said horizontal section is an upwardly extending pipe 9 having a discharge line 10 near the upper end leading to a disposal area for liquids leaving the system. A control valve 11 in line 10 controls flow therefrom.

The flexible bag or container 1 is preferably made from heat sealable plastic such as polyethylene, polypropylene, saran, nylon and the like which in sheet form are substantially impervious to gases produced in the decomposition of organic wastes, are liquid tight and substantially unaffected by the liquids in sewage and industrial wastes. Containers of any desired size and configuration are easily made from sheet material by heat sealing edges together. This provides great flexibility of installation and greatly simplifies such systems. While size and shape are not critical and will depend upon amount of matter to be treated, temperatures, amount of fluid, nature of wastes and other factors peculiar to each installation it is advantageous to have the bag elongated to provide sufficient time for processing and of such width that the flow does not wash solids too rapidly toward the outlet.

It is also advantageous in many installations to provide flow restraining means such as a weir 12 at one or more locations along the length of the bottom of the bag. As shown in FIGS. 1 and 3 the weir has at least one narrow passage 13 for the solids.

A gas outlet 15 is provided in the top of the bag at a point which will not be blocked by liquids so that the gas developed in the bag can be removed easily to storage or places of consumption.

The system operates under pressure and for this purpose the inlet pipe 3 extends upwardly to such a height that the hydrostatic head produces a pressure at the inlet 2 sufficiently higher than the pressure maintained in the bag to cause liquid to flow into and through the container. Similarly the outlet pipe 9 is of such length that the discharge line 10 leaves a column of liquid of sufficient height to produce a hydrostatic head at the outlet 6 substantially equal to the pressure maintained in the container. Overlying the bag 1 is a pressure pad 16 which largely governs the pressure in the container which has to be provided with some kind of reinforcement on the sides and ends. Almost any kind of reinforcement or supporting wall can be used, e.g., earth, rough boards, concrete block or poured concrete walls, and the like.

The pressure pad preferably is heavier at the end 17 adjacent to the discharge outlet 6 than at the other end 18 so that it assumes a position which is angular to the horizontal so that the outlet 15 is at the highest point of the upper wall of the container.

FIG. 2 shows the adaptability of the system of the invention to existing structures which may be such things as the bilge compartment of a boat, a room in a factory, a septic tank or cesspool. In this embodiment the enclosure comprises a floor 20, walls 22 and a roof 24 around the container 26 which comprises an inlet 28, an outlet 30 with a discharge line 32 leading therefrom, and a gas outlet 34. The bag 26 has sufficient strength to bridge uneven wall and floor areas without rupturing. In this embodiment the pressure is built up by the hydrostatic heads in the inlet 28 and the outlet 30 and the back pressure on the gas line 34 from the storage container now to be described. In this embodiment the usual procedures known to those skilled in the art may be followed to trap greases and other undesirable substances that may be present.

Referring now to FIG. 4 the gas storage tank 40 comprises a flexible bag or container 42 which has accordion pleated side walls to permit expansion vertically between the support for the bag at the bottom and the top of the bag which is maintained under pressure by some suitable means, e.g., standards 44 for guiding a slidable weight pad 46 that rests on top of the bag. A pressure or volume gauge 48 may be provided if desired. A gas line 50 is provided for the bag 42, e.g., an underground line joined to line 15 (likewise 34) by a band or clamp 52 and communicating with a discharge line 54 leading to the place of consumption for the gas. Valve 56 controls the outflow of the gas. A pressure relief valve 58 may also be provided if desired.

FIG. 5 shows another embodiment of a gas storage tank which comprises a simple flexible container 42a suitably supported at the sides and ends (not shown) e.g., in the manner suggested for container 1, with a pressure pad or plate 46a on the top of the bag and having a gas line 50a which may be connected to the line from the decomposition container and to a discharge line in the manner shown in FIG. 4.

In operation wastes entering the bags 1 or 26 will soon fill the bags to form a liquid seal against gas flowing out of the inlet pipes 2 and 28 but if desired physical traps may be provided, e.g., a U-bend at the bottom of the inlet pipes, to assure the sealing of the inlet lines against back flow of gases. The rate of throughflow of liquids and wastes is controlled according to temperature, amount of fluid to be handled, nature of the wastes, etc., to provide the time and conditions necessary for properly treating the wastes present in the container. If necessary to handle larger quantities of wastes or fluids than one bag is designed to treat, it is simple to operate two or more systems in parallel. This is of particular advantage in handling industrial wastes where peak loads can be held and treated in the system for more gradual and uniform discharge to normal drainage channels.

Although the invention has been described and illustrated in connection with certain preferred embodiments, those skilled in the art will recognize that modifications and variations may be made without departing from the spirit and scope of the invention set forth in the following claims.

Having thus described the invention what is claimed is:

1. A disposal system for decomposable organic wastes comprising an elongated flexible plastic container adapted to hold a substantial quantity of liquid, said container having an inlet for introducing organic waste and water at one end below the upper surface of said liquid, an outlet for withdrawing liquid and sludge at the other end below the upper surface of said liquid, an outlet for gases produced in decomposition of said wastes having communication with said container above the upper surface of said liquid whereby said gases flow from said container through said outlet for gases and not through said inlet and outlet for liquids, and means to maintain the contents of said container under super atmospheric pressure to cause said gases to flow out through said outlet for gases.

2. A disposal system as set forth in claim 1 having means to restrain the flow of undecomposed organic waste from the inlet to the outlet to provide adequate time for decomposition thereof in its passage through said container.

3. A disposal system as set forth in claim 2 in which said flow restraining means include a transverse weir having at least one narrow passage for sludge through it.

4. A disposal system as set forth in claim 1 in which said inlet is an upwardly extending pipe having such length as to provide a hydrostatic head of water that produces a pressure at the inlet sufficiently higher than the pressure maintained in said container to cause liquid to flow into said container.

5. A disposal system as set forth in claim 1 in which outlet for liquid and sludge comprises a substantially horizontal section for sludge removal having a valve for controlling flow of sludge from the container and an upwardly extending section connected to said horizontal section between said container and valve, said upwardly extending section having a discharge line communicating therewith at a sufficient height to produce a hydrostatic pressure at the outlet substantially equal to that maintained in said container.

6. A disposal system as set forth in claim 1 in which the gas outlet is connected to an expandable gas chamber maintained under pressure substantially equal to that maintained in said container.

7. A disposal system as set forth in claim 1 in which said pressure maintaining means is a gravity pad overlying said container.

8. A disposal system as set forth in claim 7 in which said pressure pad is heavier adjacent to the outlet end of the bag than adjacent to the inlet end so that the pad rests on the container at an angle to the horizonal and the gas outlet is adjacent to the upper end of the pad.

References Cited by the Examiner

UNITED STATES PATENTS

| | | |
|---|---|---|
| 1,204,534 | 11/1916 | Andrews. |
| 2,404,418 | 7/1946 | Walker. |
| 2,724,418 | 11/1955 | Krupp _____ 150—.5 |
| 2,736,356 | 2/1956 | Bender et al. _____ 150—.5 |

FOREIGN PATENTS 1,242,220  9/1960  France.

REUBEN FRIEDMAN, *Primary Examiner.*

D. M. RIESS, *Assistant Examiner.*